(12) United States Patent
Rösseler et al.

(10) Patent No.: US 11,739,809 B2
(45) Date of Patent: Aug. 29, 2023

(54) THROTTLE POINT WITH A VALVE BODY WITH A CHANGING DIAMETER

(71) Applicant: ZF Friedrichshafen AG, Friedrichshafen (DE)

(72) Inventors: Jörg Rösseler, Ruppichteroth (DE); Aleksandar Knezevic, Eitorf (DE); Steffen Heyn, Niederwerrn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 28 days.

(21) Appl. No.: 17/375,261

(22) Filed: Jul. 14, 2021

(65) Prior Publication Data
US 2022/0025955 A1    Jan. 27, 2022

(30) Foreign Application Priority Data

Jul. 21, 2020   (DE) .......................... 102020209101.3

(51) Int. Cl.
| | | |
|---|---|---|
| *F16F 9/512* | (2006.01) | |
| *F16F 9/19* | (2006.01) | |
| *F16F 9/18* | (2006.01) | |
| *F16F 9/34* | (2006.01) | |
| *F16F 9/348* | (2006.01) | |

(52) U.S. Cl.
CPC .............. *F16F 9/512* (2013.01); *F16F 9/182* (2013.01); *F16F 9/19* (2013.01); *F16F 9/3482* (2013.01)

(58) Field of Classification Search
CPC ........ F16F 9/512; F16F 9/3482; F16F 9/3484; F16F 9/34; F16F 9/3481; F16F 9/348

USPC ............................................. 188/322.15, 280
See application file for complete search history.

(56) References Cited

U.S. PATENT DOCUMENTS

| | | | | |
|---|---|---|---|---|
| 2,912,069 A | * | 11/1959 | Dillenburger | F16F 9/32 188/322.18 |
| 2,928,507 A | * | 3/1960 | Thompson | F16F 9/50 188/320 |
| 3,109,520 A | * | 11/1963 | Vossieck | F16F 9/32 267/113 |
| 3,806,105 A | * | 4/1974 | Konishi | F16F 7/09 267/116 |

(Continued)

FOREIGN PATENT DOCUMENTS

| | | |
|---|---|---|
| DE | 3620993 A1 * | 8/1987 |
| DE | 102017211300 B3 * | 10/2018 |

(Continued)

*Primary Examiner* — Thomas J Williams
(74) *Attorney, Agent, or Firm* — Kristin L. Murphy (57) ABSTRACT

A throttle point for a vibration damper, comprising a damper valve carrier with a circumferential annular groove, in which an annular valve body with a variable diameter is arranged. The annular valve body forms, with a guiding face for flowing damping medium, a throttle point, a throttle cross section of which decreases in the case of an increasing flow velocity of the damping medium within the throttle point. The circumferential annular groove forming a pressure chamber which is filled with damping medium. A radially outwardly directed actuating force acts on the valve body, wherein the pressure chamber is a constituent part of a hydraulic system which has a connector to at least one working space of the vibration damper and the hydraulic connection of which to the pressure chamber can be set.

17 Claims, 13 Drawing Sheets

(56) References Cited

U.S. PATENT DOCUMENTS

| | | | | |
|---|---|---|---|---|
| 4,588,054 | A * | 5/1986 | LeBaron | F16F 9/512 |
| | | | | 92/185 |
| 4,838,393 | A * | 6/1989 | Mourray | F16F 9/49 |
| | | | | 188/284 |
| 5,078,239 | A * | 1/1992 | Kobayashi | F16F 9/466 |
| | | | | 188/322.22 |
| 5,303,803 | A * | 4/1994 | Grun | B60G 17/08 |
| | | | | 188/282.2 |
| 6,913,128 | B2 * | 7/2005 | Muller | F16F 9/516 |
| | | | | 188/282.8 |
| 10,753,421 | B2 * | 8/2020 | Rösseler | F16F 9/512 |
| 2002/0056368 | A1 * | 5/2002 | May | F16F 9/368 |
| | | | | 188/322.18 |
| 2021/0108697 | A1 * | 4/2021 | Rösseler | F16F 9/19 |
| 2021/0108703 | A1 * | 4/2021 | Rösseler | F16F 9/512 |
| 2022/0025956 | A1 * | 1/2022 | Rösseler | F16F 9/19 |

FOREIGN PATENT DOCUMENTS

| | | | | |
|---|---|---|---|---|
| DE | 102020209109 A1 * | 1/2022 | | |
| EP | 1348828 A2 * | 10/2003 | | E05F 5/02 |

* cited by examiner

THROTTLE POINT WITH A VALVE BODY WITH A CHANGING DIAMETER

CROSS-REFERENCE TO RELATED APPLICATION

This application claims priority to German Patent Application No. 102020209101.3 filed Jul. 21, 2020, the disclosure of which is incorporated herein by reference in its entirety.

TECHNICAL FIELD

The disclosure relates to a damper valve device.

BACKGROUND

DE 10 2016 210 790 A1 describes a damper valve device with an annular valve body within an annular groove of a valve carrier. With a flow guiding face, the valve body forms a throttle point which reduces the flow cross section in the case of an increasing flow velocity of a damping medium within the throttle point.

The annular groove forms a pressure chamber for the valve body with the pressure chamber being filled with damping medium and brings about a radially outwardly directed widening actuating force on the valve body.

SUMMARY

A damper valve device is disclosed herein. Via the setting capability of the damper valve device, at least one component of a hydraulic system can be set so as to be adapted in a targeted manner to various application requirements without modifications of the component dimensions.

One possibility includes that the hydraulic system has a connector to at least one working space of a vibration damper, a hydraulic connection of which connector to a pressure chamber can be set. A use point but also a use speed of a throttle point can be varied via the setting.

In one exemplary arrangement, the hydraulic system can have a connecting channel between two working spaces of the vibration damper, with the connecting channel being connected to the pressure chamber, and the cross section of the connecting channel can be set. Here, an inflow side or an outflow side of the connecting channel can selectively be subjected to a greater or lesser throttle effect.

Furthermore, there is the possibility that a bypass channel is connected hydraulically in parallel with the connecting channel, whereby the connecting channel and the bypass channel are connected to the pressure chamber, and it being possible for the active cross section of the bypass channel to be set. The advantage of this exemplary arrangement is in that the bypass channel can be closed completely, and the connecting channel affords a minimum cross section. As a result, the regulation, in the case of an active adjustment of the bypass channel, is simplified.

As an alternative arrangement, the connecting channel can have a connector channel to the pressure chamber, whereby the cross section of the connector channel can be set. This variant affords the advantage that the pressure chamber can be subjected to radial incident flow and possibly has only a single connector opening. This feature affords the possibility that a restoring movement of the valve body into a starting diameter can be actuated independently of the flow velocity within the throttle point, by the connector being blocked.

In accordance with one exemplary configuration, a flow channel within a hollow piston rod can be connected to the hydraulic system. This flow channel is readily accessible from the outside and facilitates the use of an actuator, with the result that an active cross section of the flow channel can be adjusted via the actuator.

Despite the adjustability of the throttle point, in one exemplary arrangement, it can be assigned a further passive damper valve hydraulically in series.

In one exemplary arrangement, the series connection has a bypass channel with an adjustable cross section, the bypass bridging the throttle point hydraulically. Here, the volumetric flow through the throttle point and the volumetric flow into the pressure chamber are set. The advantage of this solution lies in the fact that the use point of the throttle point is changed overall.

Tests have shown that it can be highly appropriate if the series connection has a bypass channel which bridges both the throttle point and the further damper valve hydraulically.

The disclosure is to be described in greater detail on the basis of the following description of the figures.

DETAILED DESCRIPTION

Figure 1:
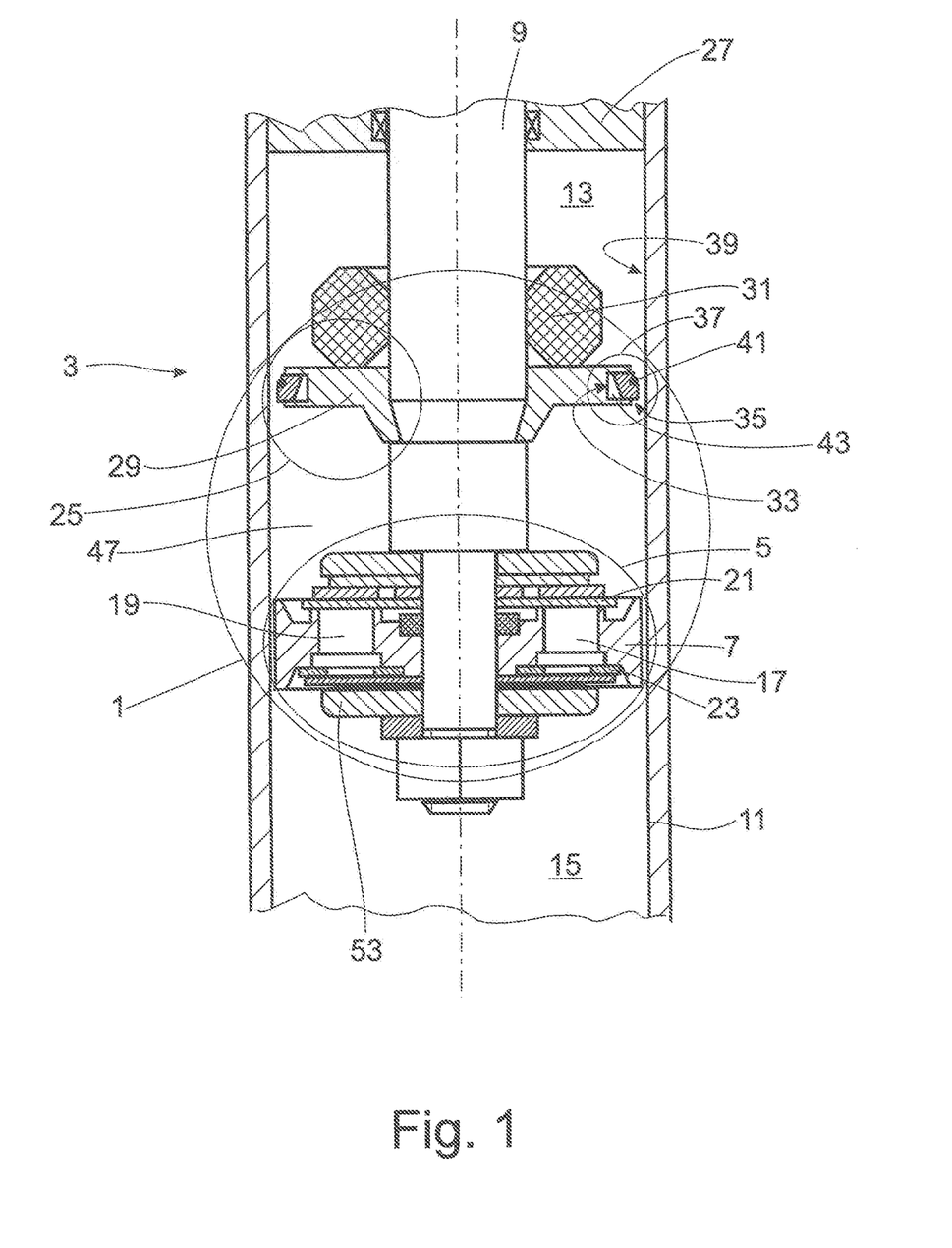
FIG. 1 shows a vibration damper in a sectional illustration.

FIG. 1 shows a damper valve device 1 for a vibration damper 3 of any desired overall design (only details of which are shown). This illustration serves as a basis for all further alternative illustrations and structural modifications. The damper valve device 1 comprises a first damper valve 5 with a damper valve body which is configured as a piston 7 and is fastened to a piston rod 9.

The damper valve body 7 divides a cylinder 11 of the vibration damper into a piston rod-side working space 13 and a working space 15 which is remote from the piston rod. Both working spaces 13, 15 are filled with damping medium. Passage channels 17; 19 for in each case one throughflow direction are configured on different pitch circles in the damper valve body 7. The configuration of the passage channels is to be considered merely by way of example. An outlet side of the passage channels 17; 19 is covered at least partially by way of at least one valve plate 21; 23.

The vibration damper optionally has a tension stop 25 which, from a defined extension movement of the piston rod 9, comes into contact with a cylinder-side stop face, for example a piston rod guide 27.

The tension stop 25 comprises a carrier disk 29 which is fixed directly on the piston rod 9 by way of a positive locking connection. An annular elastomer element 31 is placed, by way of example, on an upper side of the carrier disk 29. The annular elastomer element 31 is held via a small radial prestress even in the case of a vibrating movement of the piston rod 9. From a stop point on a stop face, the elastomer element 31 acts as an additional supporting spring.

The carrier disk 29 forms, by way of example, a damper valve carrier and, in this function, has a circumferential annular groove 33, in which a valve body 35 of variable diameter is guided. The damper valve carrier can fundamentally also be configured and arranged spatially in another spatial shape. The variability of the diameter can be achieved by way of the use of an elastic material or else by way of a slotted design. A multiple-piece design of the valve body 35 is also conceivable. With an inner wall of the cylinder 11, the annular valve body 35 forms a throttle point 37, the inner wall 39 representing a flow guide face.

On the outer side, the valve body 35 carries a restoring ring 41, for example in the configuration of a securing ring. The restoring ring 41 ensures a radial restoring force on the valve body in the direction of the annular groove 33.

Together with the valve body 35, the annular groove 33 delimits a pressure chamber 43 which is maintained even in the case of a minimum internal diameter of the annular valve body 35. The pressure chamber 43 is a constituent part of a hydraulic system 45 which directly or indirectly determines the pressure level within the pressure chamber via line connections within the vibration damper, in particular within the damper valve device 1.

Figure 2:
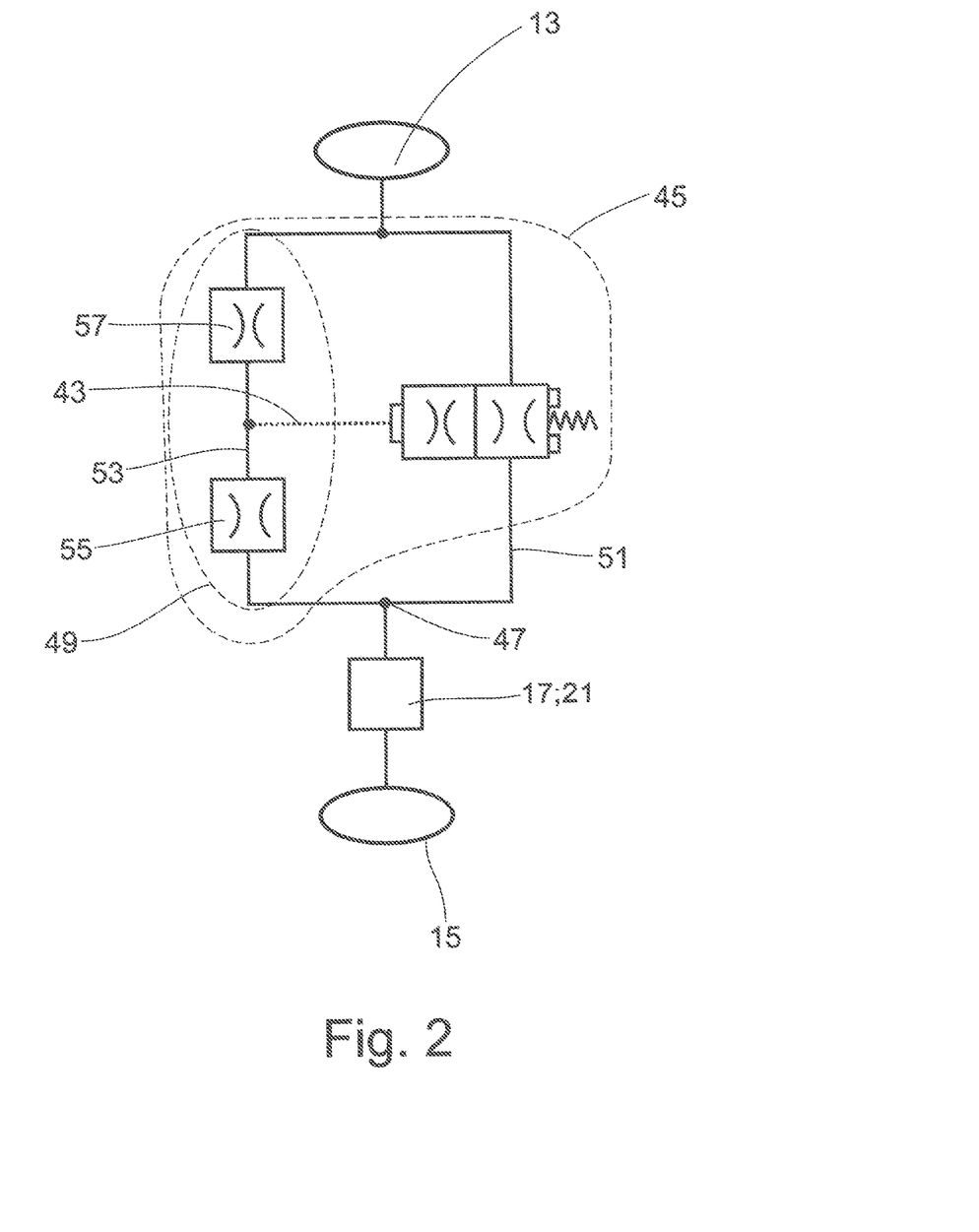
FIG. 2 shows an alternative illustration to FIG. 1.

FIG. 2 shows an alternative illustration to FIG. 1. Starting from a working space 15, the damping medium flows through the passage channel 17, the valve plate 21 lifting up from the piston 7. The damping medium flows into an annular space 47 between the piston 7 and the carrier disk 29. From the annular space 47, the flow path continues via the hydraulic system 45 into the working space 13, the damping medium within the hydraulic system 45 being divided into a throttle flow and a control flow within a control line 49 of the hydraulic system 45. The throttle flow determines the damping force of the damper valve device 1, and the control flow serves to generate a pressure force within the pressure chamber 45. A connection between the control line 49 and a throttle line is formed by the annular space 47 between the piston 7 and the carrier disk 29.

A connecting channel 53 as part of the control line 49 connects the piston rod-side working space 13 to the annular space 47. The pressure chamber 43 which extends as far as the throttle point 37 which is shown as a switchable throttle valve is situated functionally between two throttles 55; 57 within the connecting channel 53. The throttles can be formed, for example, by an inflow opening and an outflow opening into the connecting channel 53. In a manner which is dependent on the pressure level at the throttle point 37 and within the pressure chamber 43, the valve body 35 widens radially or contracts into its starting position again on account of the radial restoring force of the limiting ring 41. Although, in the case of a high stroke speed of the piston rod 9 with respect to the cylinder 11, the flow velocity within the throttle point 37 increases, the pressure within the throttle point 37 drops. In parallel with this, in the case of a relatively high stroke speed, the pressure within the pressure chamber 43 of the throttle point 37 increases. Both effects lead to the radial widening movement of the annular valve body 35 in the direction of the inner wall 39 of the cylinder 11. As a consequence, the throttle cross section of the throttle point 37 decreases, but the damping force increases.

Figure 3:
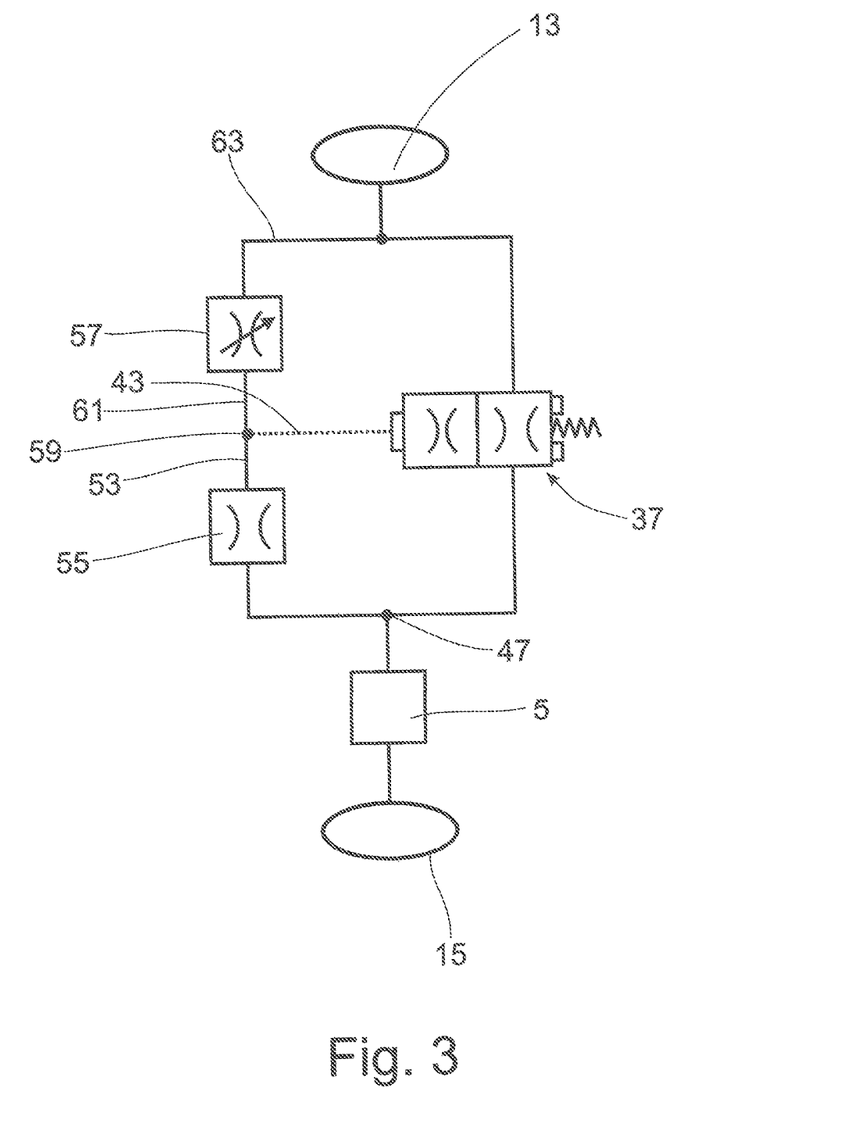
FIGS. 3 and 4 show alternative variants to FIG. 2.
Figure 4:
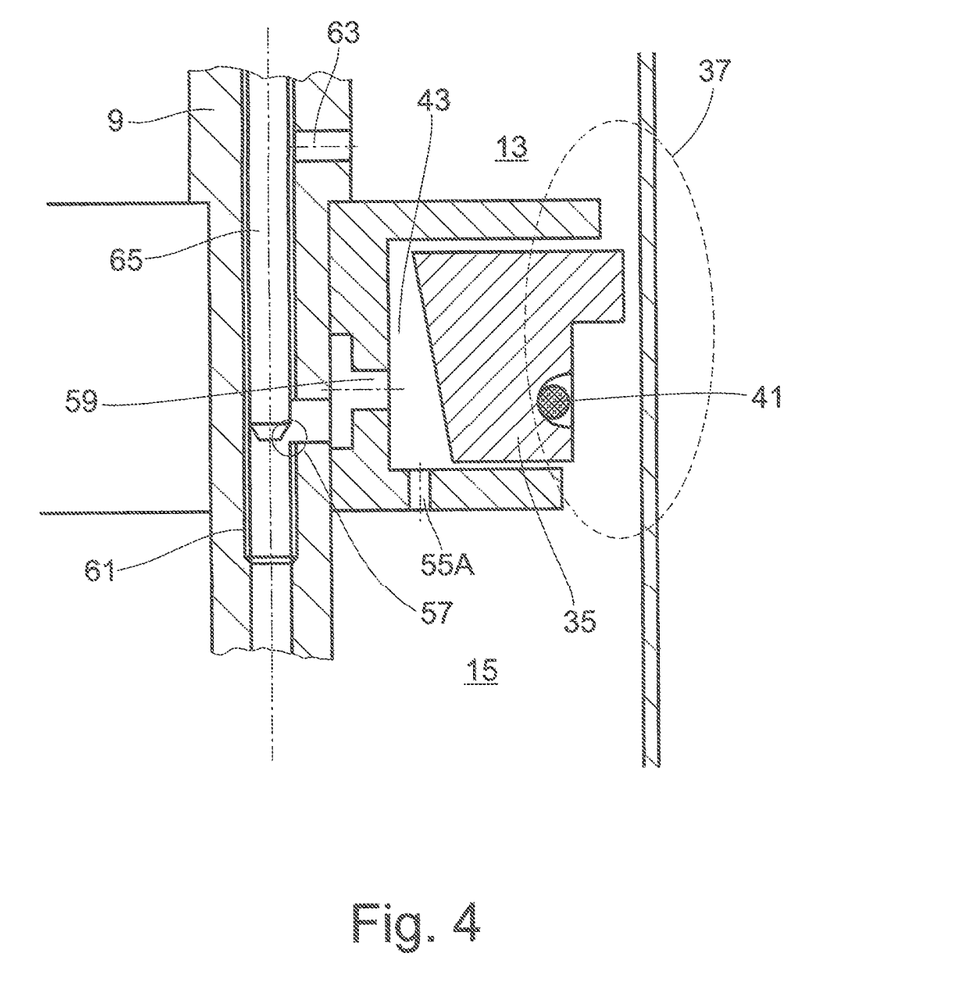

FIGS. 3 and 4 show one variant of the disclosure, in the case of which the hydraulic system 45 has a connector (produced by way of the throttle 57) to the working space 13 of the vibration damper 3, the hydraulic connection of which throttle 57 to the pressure chamber 43 can be set arbitrarily. To this end, the hydraulic system 45 has the connecting channel 53 between the two working spaces 13; 15 of the vibration damper 3, which connecting channel 53 is connected to the pressure chamber 43, and the cross section of which connecting channel 53 can be set via the throttle 57. The inflow or the outflow of damping medium into the pressure chamber can fundamentally be set.

In the exemplary implementation of the alternative illustration according to FIG. 3, the carrier disk according to FIG. 4 has a through opening 59 which connects the pressure space 43 to a blind hole channel 61 within the piston rod 9. The through opening 59 and the blind hole channel 61 form that part of the connecting channel 53, in which the adjustable throttle 57 is also arranged. The blind hole channel 61 is also joined by a radial channel 63 which opens into the piston rod-side working space 13. An axially adjustable throttle rod 65 which can be actuated by hand or by external power is arranged within the blind hole channel 61. In this pictorial representation, the throttle is formed by a seat valve. A slide valve together with the through opening 59 or the radial channel 63 would also be conceivable.

Figure 5:
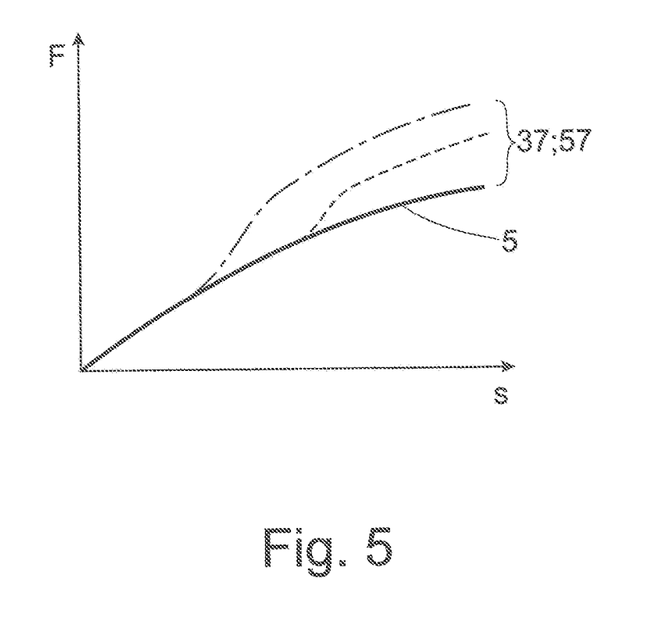
FIG. 5 shows a damping force characteristic curve.

FIG. 5 shows the influence of the throttle point on a damping force characteristic curve of the damper valve device 1. According to this, there is a tendentially degressive basic characteristic curve of the damper valve 5 (shown by way of a solid line), which basic characteristic curve, in the case of the use of the throttle point 37 in conjunction with a throttle 57 opened to the maximum extent (shown by way of dashed line), allows the damping force to rise at a defined flow velocity S. By way of a throttle 57 which is opened at a minimum extent, the use point of the throttle point 37 shifts in the direction of the lower flow velocity and, due to the greater degree of closing of the throttle point, the damping force which can be achieved at the throttle point also increases.

Figure 6:
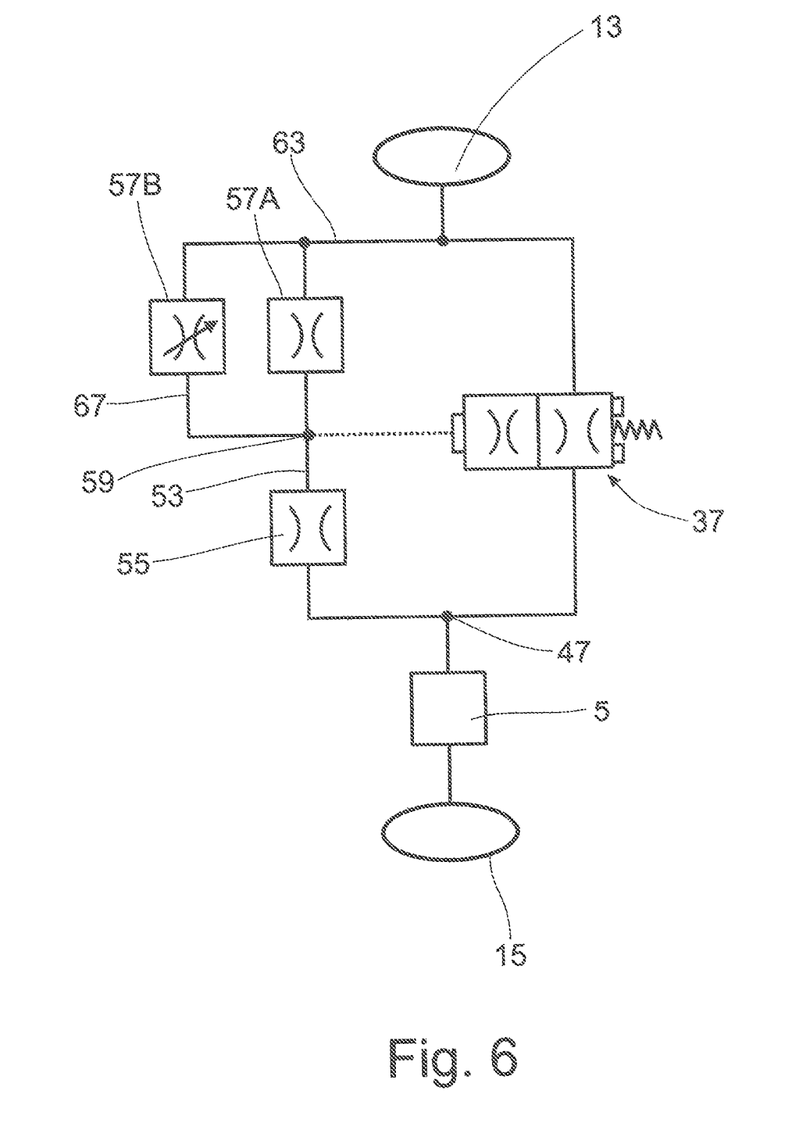
FIGS. 6-11 show alternative variants to FIGS. 3 and 4.
Figure 7:
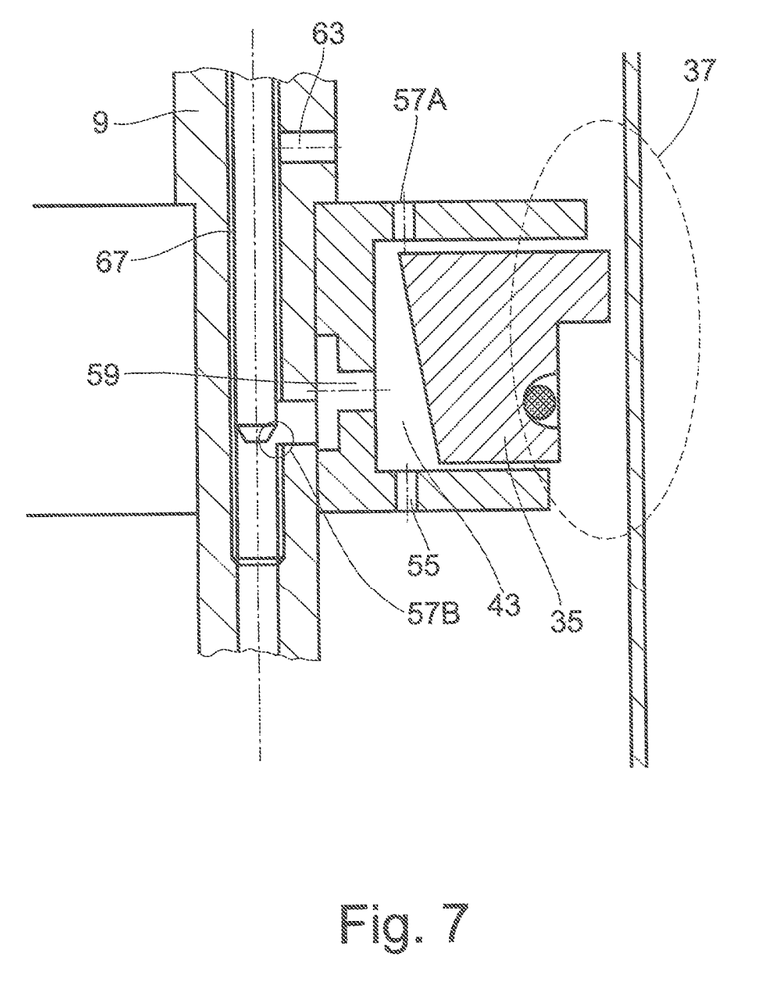

Exemplary arrangements according to FIGS. 6 and 7 are based on the arrangements depicted according to FIGS. 3 to 5. In addition to the connecting channel 53 with its throttles 55; 57A, the damper valve device or the hydraulic system 45 has a bypass channel 67 which is connected hydraulically in parallel with the connecting channel 53 between the pressure chamber 43 and the working space 13, it being possible for the active cross section of a throttle 57B in the bypass channel 67 to be set, as described in conjunction with FIG. 4. To this end, the pressure chamber 43 has a further connector or the through opening 59 which opens into the bypass channel 65 within the hollow piston rod 9. In the case of this principle, damping force setting which is still comfortable can be achieved even in the case of failure or faulty setting of the throttle 57B within the bypass channel 67, without it being necessary for additional emergency operation measures to be applied at the actuator in order to set the active cross section of the throttle 57B.

Figure 8:
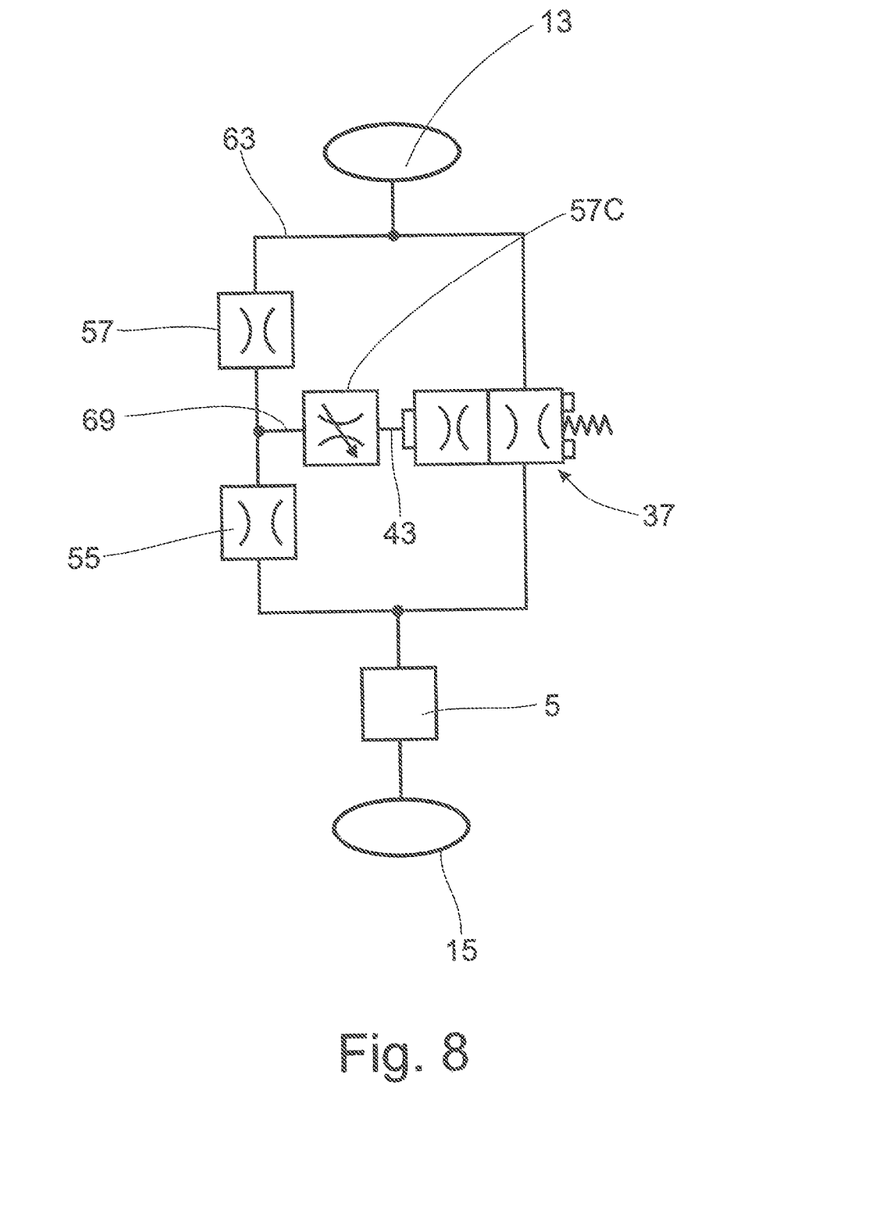
Figure 9:
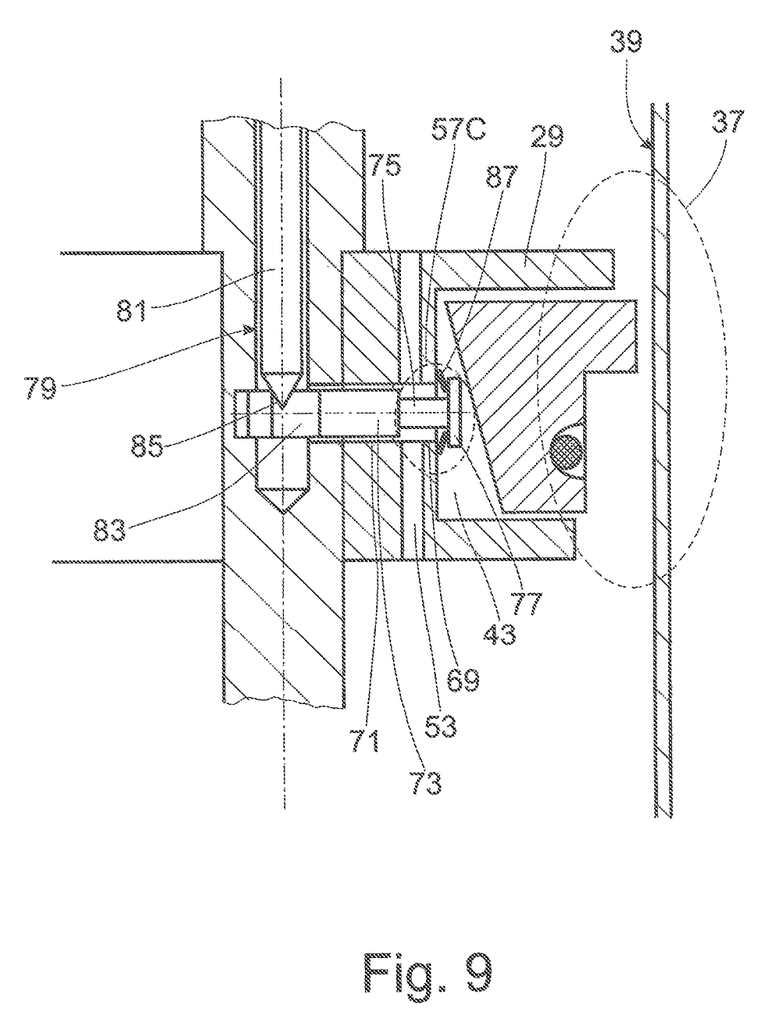

FIGS. 8 and 9 show that, in the case of the damper valve device 3, it is also possible for the connecting channel 53 to be connected to the pressure chamber 43 via a connector channel 69 and for the cross section of the connector channel 69 to be set a throttle 57C. According to FIG. 9, the connector channel 69 extends radially from the pressure chamber 43 as far as into the connecting channel 53. Via its flow resistance, the connecting channel 53 functionally has the throttles 55; 57. The connector channel 69 is adjoined by a guide 71 for a valve bolt 73 which reaches from the pressure chamber as far as into the hollow piston rod 9. The valve bolt is sealed in the region of the guide 71, with the result that no damping medium passes into the hollow piston rod.

Within the connector channel 69, the valve bolt 73 has a circumferential groove 75 which is delimited on one side by a head 77 of the valve bolt 73. In the intersection region of the groove 75 of the valve bolt with the connecting channel 53, the damping medium can flow around the valve bolt 73.

The head 77 of the valve bolt 73 has a greater diameter than the connector channel 69, with the result that the valve bolt 73 can be displaced only to a limited extent in the direction of the hollow piston rod 9. A guide channel 79 for an actuator rod 81 within the piston rod 9 intersects the guide 71 for the valve bolt 73. In the overlap region of the valve bolt 73 with the guide channel 79, the valve bolt 73 has a through opening 83 for the actuator rod 81, which through opening 83 forms a sliding connection with a cone 85 on the actuator rod 81. An axial movement of the actuator rod 81 leads to a radial movement of the valve bolt 73. A restoring spring 87 between the head 77 of the valve bolt 73 and the wall of the pressure chamber 43 ensures a restoring movement of the valve bolt 73 into a maximum passage position.

If the actuator rod 81 is pushed in more deeply within the piston rod 9, the valve bolt 73 moves in the direction of the connecting channel 53 or in the direction of the wall of the pressure chamber 43. As a result, the supply of the pressure chamber 43 with damping medium is reduced or the pressure drop between the working space and the pressure chamber is increased. As a consequence, the displacement action on the valve body 35 of the throttle point 37 starts at a later time than in the case of a connector channel 69 which is throttled to a less pronounced extent.

Figure 10:
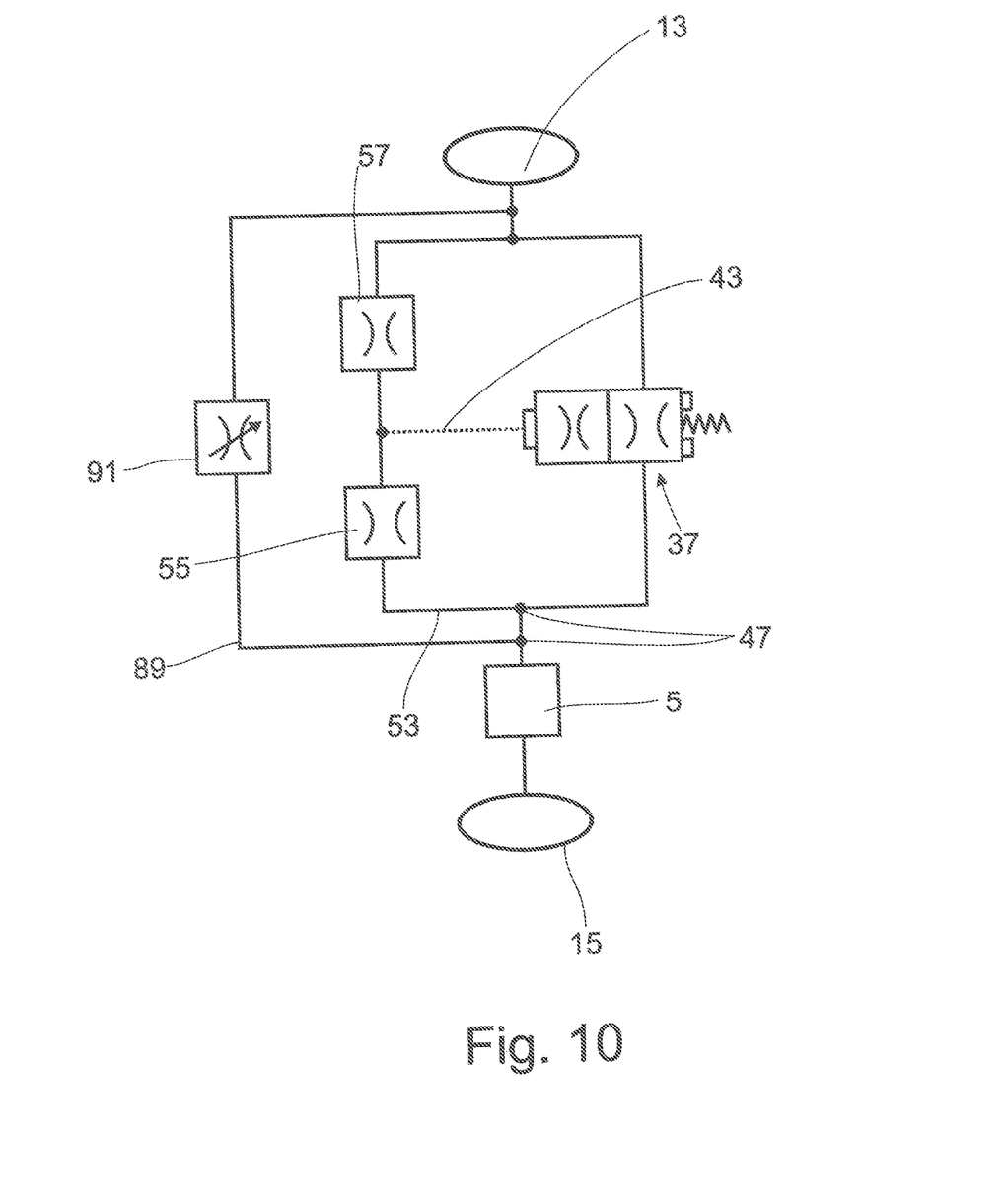
Figure 11:
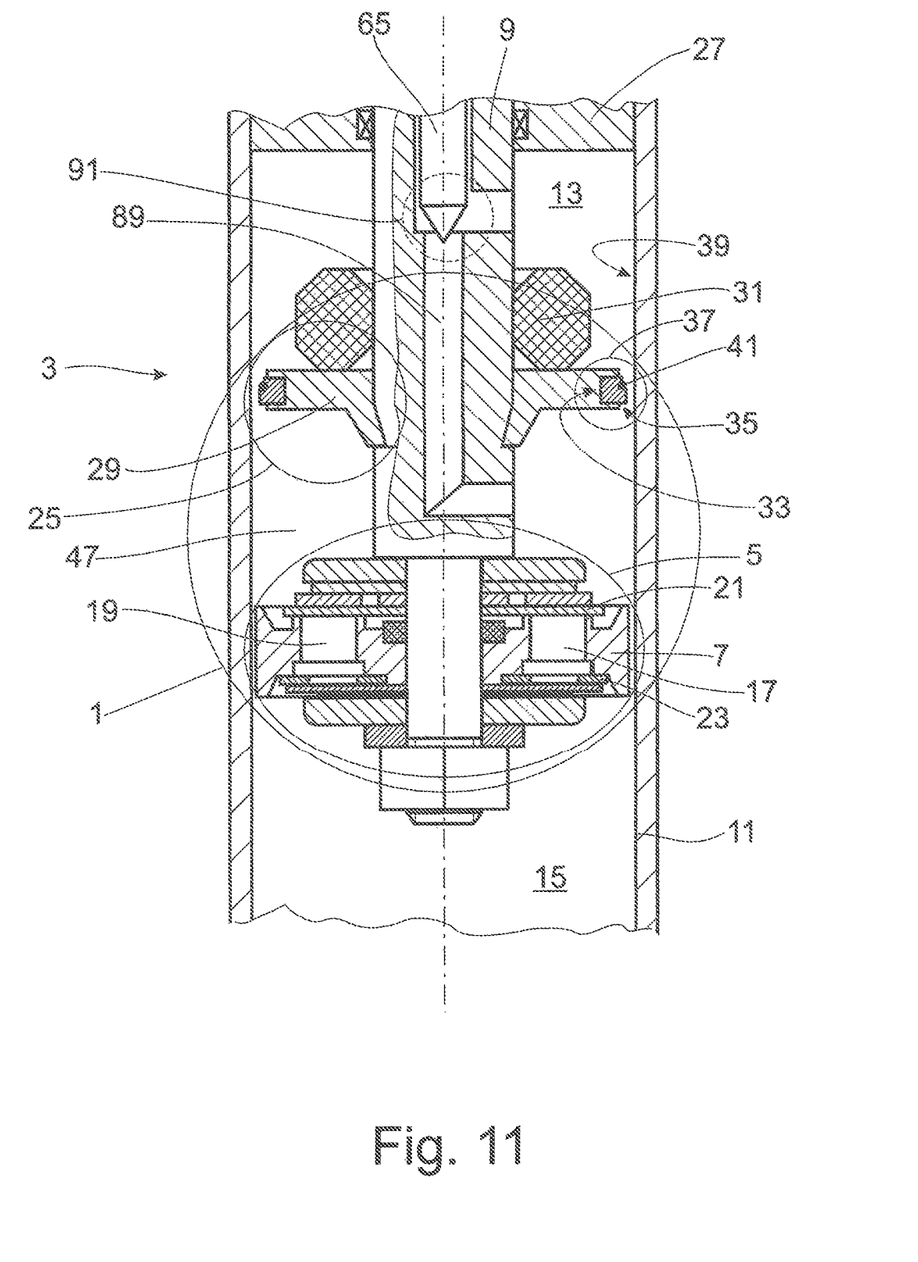

FIGS. 10 and 11 show a further exemplary arrangement of the damper valve device 1, in the case of which a flow channel 89 within a hollow piston rod 9 is connected to the hydraulic system 45, which flow channel 89 forms a bypass for the connecting channel 53, but is connected hydraulically to the connecting channel via the annular space 47, as illustrated in FIG. 11. Via the active cross section of the throttle 91 or the flow channel 89, which active cross section can be adjusted via an actuator, the damping medium proportion which flows through the connecting channel 53 and therefore into the pressure chamber 43 is determined, with the result that, via this, the effect of a throttle point 37 can be set by the throttle rod 85. In this way, the flow path through the throttles 55; 57 overall can be bridged hydraulically. In FIG. 10, the connection principle is implemented, in the case of which no flow connections to the flow channel 89 have to be configured on the valve carrier 29. The connection between the flow channel 89 and the connecting channel 53 exists via radial channels 63 which open on both sides of the carrier disk 29 into the connected working spaces 13; 47.

As has already been described in conjunction with FIG. 1, the throttle point is assigned the further damper valve hydraulically in series. The active cross-sectional magnitude of the bypass channel has no influence, however, on the damping force characteristic curve of the second damper valve.

Figure 12:
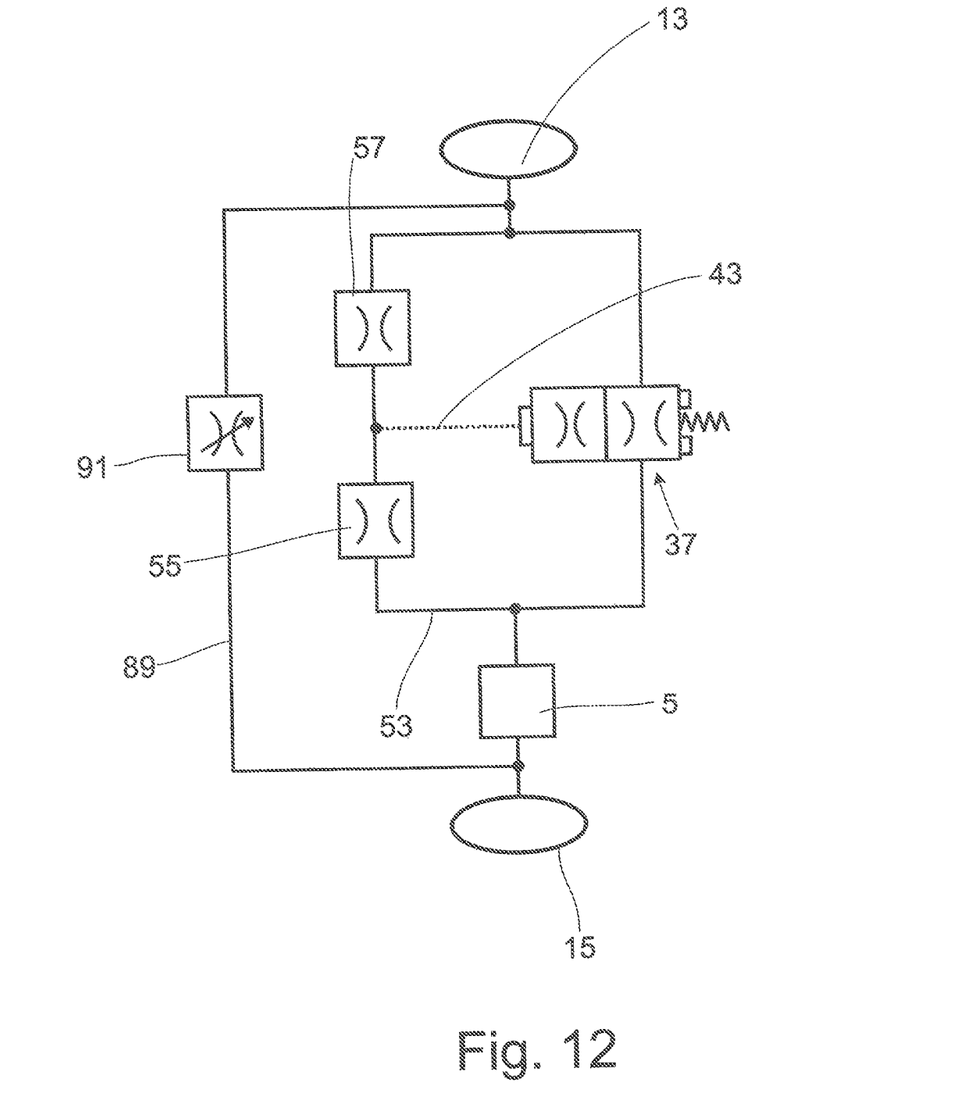
FIG. 12 shows an alternative illustration to FIG. 13.
Figure 13:
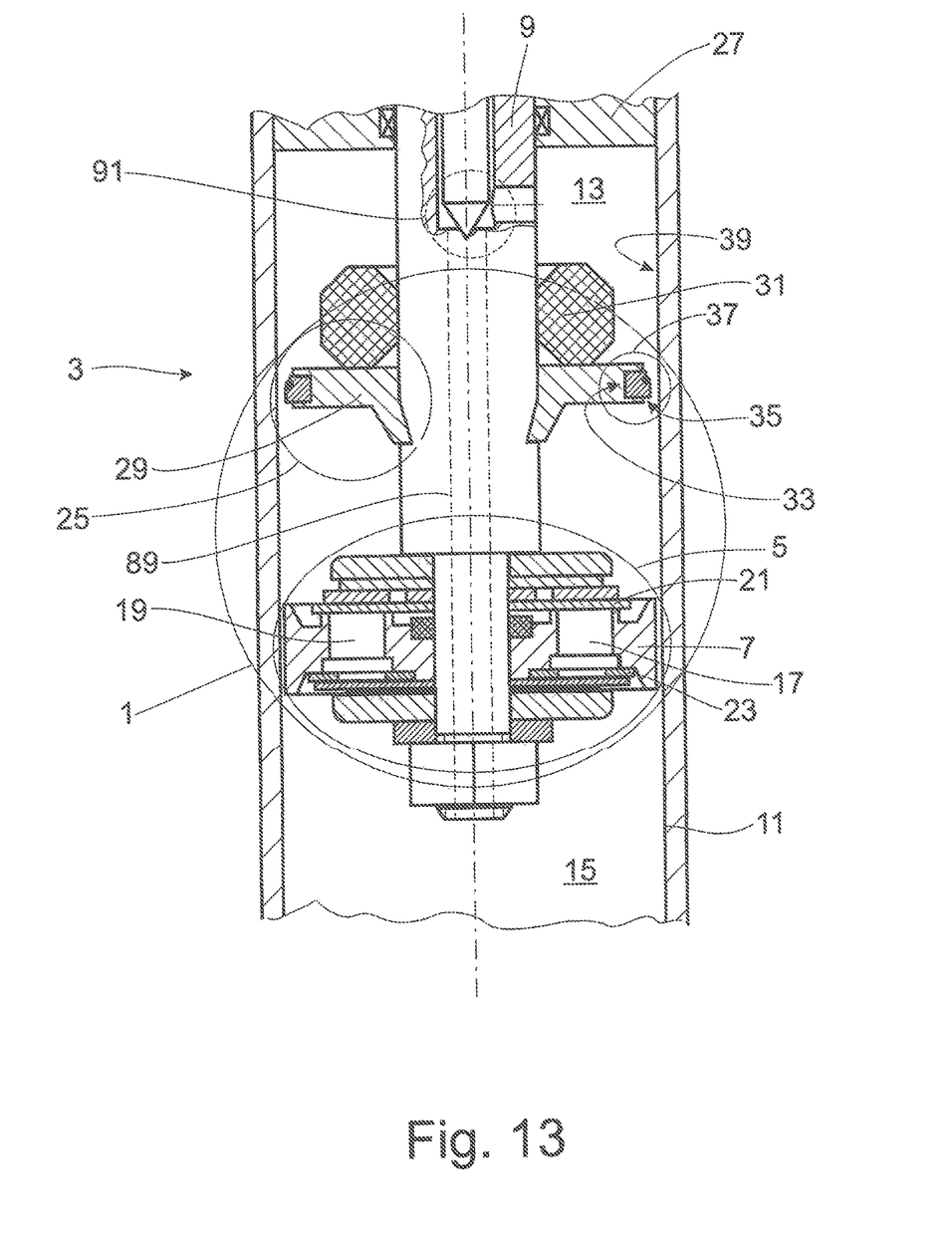
FIG. 13 shows a structural embodiment according to FIG. 12.

The alternative illustration according to FIG. 12 is greatly similar to the embodiment according to FIG. 10. In a deviation, the series circuit including a throttle point 37 and a further damper valve 5 has a bypass channel or flow channel 89 for the connecting channel 53 which hydraulically bridges both the throttle point 37 and the further damper valve 5. In this way, in the case of opening of the flow channel or the throttle 91, the damping force of the entire damper valve device 1 is shifted tendentially toward a softer characteristic. This damping property is advantageous, in particular, for motorcycles. FIG. 13 shows one possible structural embodiment of the throttle point and the damper valve in accordance with the alternative illustration according to FIG. 12.

The invention claimed is:

1. A throttle point for a vibration damper, comprising a damper valve carrier with a circumferential annular groove, in which an annular valve body with a variable diameter is arranged, the annular valve body forms, with a flow guiding face for flowing damping medium, the throttle point, a throttle cross section of which decreases with an increase flow velocity of the damping medium within the throttle point, the circumferential annular groove forming a pressure chamber which is filled with damping medium, wherein a radially outwardly directed actuating force acts on the valve body, the pressure chamber being a constituent part of a hydraulic system of the damper valve device, wherein the hydraulic system has a connector to at least one working space of the vibration damper, wherein a hydraulic connection of the connector to the pressure chamber is adjustable, and wherein a connecting channel is positioned between two working spaces of the vibration damper, and wherein a bypass channel is connected hydraulically in parallel with the connecting channel, the connecting channel and the bypass channel being connected to the pressure chamber, and wherein an active cross-section of the bypass channel is adjustable.

2. The throttle point as claimed in claim 1, wherein wherein a cross section of the connecting channel is adjustable.

3. The throttle point as claimed in claim 2, wherein the connecting channel has a connector channel to the pressure chamber, and wherein a cross section of the connector channel is adjustable.

4. The throttle point as claimed in claim 2, further comprising a carrier disk, wherein the carrier disk comprises a through opening which connects thea pressure space to a blind hole channel within a piston rod.

5. The throttle point as claimed in claim 4, wherein the blind hole channel is jointed by a radial channel that opens into one of the working spaces.

6. The throttle point as claimed in claim 5, wherein an axially adjustable throttle rod is arranged within the blind hole channel.

7. The throttle point as claimed in claim 2, wherein the connecting channel further comprises opposing throttles that are in communication with the pressure chamber, as well as a further connector that opens into a bypass channel.

8. The throttle point as claimed in claim 2, wherein wherein a diameter of a cross-section of the connector channel may be set by a throttle, wherein the connector channel extends radially from the pressure chamber and into the connecting channel.

9. The throttle point as claimed in claim 8, wherein the connector channel is adjoined by a guide for a valve bolt which reaches from the pressure chamber and into a hollow piston rod.

10. The throttle point as claimed in claim 9, wherein the valve bolt has a circumferential groove which is delimited on one side by a bolt head, wherein the bolt head has a greater diameter than the connector channel and the valve bolt can be displaced only to a limited extent in a direction of the hollow piston rod.

11. The throttle point as claimed in claim 9, further comprising a guide channel for an actuator rod within the piston rod, the guide channel intersecting the guide for the valve bolt.

12. The throttle point as claimed in claim 11, wherein the valve bolt has a through opening for the actuator rod, the through opening forming a sliding connection with a cone on the actuator rod, and wherein an axial movement of the actuator rod leads to a radial movement of the valve bolt.

13. The throttle point as claimed in claim 12, further comprising a restoring spring disposed between the valve bolt and a wall of the pressure chamber, wherein the restoring spring ensures a restoring movement of the valve bolt into a maximum passage position.

14. The throttle point as claimed in claim 1, wherein a flow channel within a hollow piston rod is connected to the hydraulic system.

15. A throttle point for a vibration damper, comprising:
a damper valve carrier with a circumferential annular groove in which an annular valve body with a variable diameter is arranged,
wherein the annular valve body forms, with a flow guiding face for flowing damping medium, the throttle point,
a throttle cross section which decreases with an increase flow velocity of the damping medium within the throttle point,
wherein the circumferential annular groove forms a pressure chamber which is filled with damping medium,
wherein a radially outwardly directed actuating force acts on the valve body, wherein the pressure chamber is a constituent part of a hydraulic system of the damper valve device,
wherein a flow channel within a hollow piston rod is connected to the hydraulic system and an active cross section of the flow channel is adjustable via an actuator; and
wherein the throttle point is assigned a further damper valve hydraulically in series.

16. The throttle point as claimed in claim 15, wherein the series connection has a flow channel with an adjustable cross section, a_bypass bridging the throttle point hydraulically.

17. The throttle point as claimed in claim 15, wherein the series connection has a flow channel which bridges both the throttle point and the further damper valve hydraulically.

* * * * *